(12) United States Patent
Hsieh et al.

(10) Patent No.: US 11,920,304 B2
(45) Date of Patent: Mar. 5, 2024

(54) AQUEOUS EXFOLIATED GRAPHENE BY AMPHIPHILIC CELLULOSE NANOFIBRILS FOR FOLDABLE AND MOISTURE-RESPONSIVE NANOPAPER

(71) Applicant: The Regents of the University of California, Oakland, CA (US)

(72) Inventors: You-Lo Hsieh, Davis, CA (US); Xuezhu Xu, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 214 days.

(21) Appl. No.: 17/288,375

(22) PCT Filed: Oct. 28, 2019

(86) PCT No.: PCT/US2019/058376
§ 371 (c)(1),
(2) Date: Apr. 23, 2021

(87) PCT Pub. No.: WO2020/087075
PCT Pub. Date: Apr. 30, 2020

(65) Prior Publication Data
US 2021/0381167 A1 Dec. 9, 2021

Related U.S. Application Data

(60) Provisional application No. 62/751,339, filed on Oct. 26, 2018.

(51) Int. Cl.
| | | |
|---|---|---|
| D21H 11/18 | (2006.01) |
| C01B 32/184 | (2017.01) |
| C01B 32/21 | (2017.01) |
| D21F 13/00 | (2006.01) |
| D21H 17/67 | (2006.01) |
| D21H 27/00 | (2006.01) |

(52) U.S. Cl.
CPC ......... *D21H 11/18* (2013.01); *C01B 32/184* (2017.08); *C01B 32/21* (2017.08); *D21F 13/00* (2013.01); *D21H 17/67* (2013.01); *D21H 27/00* (2013.01)

(58) Field of Classification Search
CPC ........ D21H 11/18; D21H 17/67; D21H 27/00; C01B 32/184; C01B 32/21; D21F 13/00
USPC ...................................................... 162/181.9
See application file for complete search history.

(56) References Cited

U.S. PATENT DOCUMENTS

| | | | |
|---|---|---|---|
| 9,255,008 B2 * | 2/2016 | Howard ................... | C01B 32/22 |
| 11,248,107 B2 | 2/2022 | Hsieh et al. | |
| 11,549,854 B2 | 1/2023 | Hsieh et al. | |
| 2012/0216718 A1 | 8/2012 | Berglund et al. | |
| 2014/0134415 A1 * | 5/2014 | Gong ....................... | C08J 9/0076 |
| | | | 521/64 |
| 2016/0010279 A1 | 1/2016 | Hu et al. | |
| 2018/0040806 A1 | 2/2018 | Gong et al. | |
| 2019/0309144 A1 | 10/2019 | Hsieh et al. | |
| 2020/0339783 A1 | 10/2020 | Cunha et al. | |
| 2020/0363273 A1 | 11/2020 | Hsieh et al. | |
| 2021/0156051 A1 | 5/2021 | Hsieh et al. | |
| 2022/0195148 A1 | 6/2022 | Hsieh et al. | |

FOREIGN PATENT DOCUMENTS

| | | |
|---|---|---|
| CN | 104264260 A | 1/2015 |
| WO | 2017116598 A1 | 7/2017 |

OTHER PUBLICATIONS

Khasim, Journal of Electronic Materials, 2017, 46(7), 4439-4447.
Li et al., "Direct Ink Write 3D Printed Cellulose Nanofiber Aerogel Structures with Highly Deformable, Shape Recoverable, and Functionalizable Properties", ACS Sustainable Chemistry & Engineering 2018, 6(2), 2011-2022.
Yang, "Flexible highly specific capacitance aerogel electrodes based on cellulose nanofibers, carbon nanotubes and polyaniline", Electrochimica Acta, 2015, 182, 264-271.
International Search Report and Written Opinion received for PCT Application No. PCT/US2019/058376, dated Jan. 13, 2020, 9 pages.
Gao et al. (2010) "Epitaxial Graphene on Cu(111)", Nano Letters, 10(9):3512-3516.
Geim A.K. (Jun. 19, 2009) "Graphene: Status and Prospects", Science, 324(5934):1530-1534.
Isobe et al. (Jan. 8, 2018) "Clear Transparent Cellulose Nanopaper Prepared from a Concentrated Dispersion by High-Humidity Drying", RSC Advances, 8(8):1833-1837.
Jiang et al. (2014) "Amphiphilic Superabsorbent Cellulose Nanofibril Aerogels", Journal of Materials Chemistry A, 2(18):6337-6342.
Jiang et al. (2017) "Cellulose Nanofibril Aerogels: Synergistic Improvement of Hydrophobicity, Strength, and Thermal Stability via Cross-Linking with Diisocyanate", ACS Applied Materials & Interfaces, 9(3):2825-2834.
Jiang et al. (2013) "Chemically and Mechanically Isolated Nanocellulose and Their Self-assembled Structures", Carbohydrate Polymers, 95(1):32-40.
Jiang et al. (2013) "Controlled Defibrillation of Rice Straw Cellulose and Self-assembly of Cellulose Nanofibrils into Highly Crystalline Fibrous Materials†", RSC Advances, 3:12366-12375.
Jiang et al. (2018) "Dual Wet and Dry Resilient Cellulose II Fibrous Aerogel for Hydrocarbon-Water Separation and Energy Storage Applications", ACS Omega, 3(3):3530-3539.
Jiang et al. (2016) "Self-assembling of TEMPO Oxidized Cellulose Nanofibrils as Affected by Protonation of Surface Carboxyls and Drying Methods", ACS Sustainable Chemistry & Engineering, 4(3):1041-1049.
Kobayashi et al. (Sep. 22, 2014) "Aerogels with 3D Ordered Nanofiber Skeletons of Liquid-Crystalline Nanocellulose Derivatives as Tough and Transparent Insulators†", Angewandte Chemie-International Edition, 53(39):10394-10397.

(Continued)

*Primary Examiner* — Mark Halpern
(74) *Attorney, Agent, or Firm* — Mintz, Levin, Cohn, Ferris, Glovsky and Popeo, P.C.

(57) ABSTRACT

The present invention describes a method for preparing graphene by mixing graphite and carbon nanofibrils. The prepared graphene can be used to form nanopaper. The present invention also provides a method of preparing nanopaper by suspending cellulose nanofibrils and graphene, followed by vacuum filtering of the suspension.

8 Claims, 7 Drawing Sheets

(56) References Cited

OTHER PUBLICATIONS

Lotya et al. (Mar. 2009) "Liquid Phase Production of Graphene by Exfoliation of Graphite in Surfactant/Water Solutions", Journal of the American Chemical Society, 131(10):3611-3620.

Lu et al. (2012) "Preparation and Characterization of Cellulose Nanocrystals from Rice Straw", Carbohydrate Polymers, 87(1):564-573.

Pääkko et al. (2008) "Long and Entangled Native Cellulose I Nanofibers Allow Flexible Aerogels and Hierarchically Porous Templates for Functionalities", Soft Matter, 4(12):2492-2499.

Paton et al. (2014) "Scalable Production of Large Quantities of Defect-free Few-layer Graphene by Shear Exfoliation in Liquids", Nature Materials, 13(6):624-630.

Sehaqui et al. (2010) "Mechanical Performance Tailoring of Tough Ultra-high Porosity Foams Prepared from Cellulose I Nanofiber Suspensions", Soft Matter, 6:1824-1832.

Wicklein et al. (2015) "Thermally Insulating and Fire-retardant Lightweight Anisotropic Foams Based on Nanocellulose and Graphene Oxide", Nature Nanotechnology, 10:277-283.

Xu et al. (2019) "Aqueous Exfoliated Graphene by Amphiphilic Nanocellulose and its Application in Moisture-responsive Foldable Actuatorst", Nanoscale, 11:11719-11729.

Xu et al. (Mar. 22, 2013) "Cellulose Nanocrystals vs. Cellulose Nanofibrils: A Comparative Study on Their Microstructures and Effects as Polymer Reinforcing Agents", ACS Applied Materials & Interfaces, 5(8):2999-3009.

Xu et al. (May 12, 2014) "Comparison Between Cellulose Nanocrystal and Cellulose Nanofibril Reinforced Poly(ethylene oxide) Nanofibers and Their Novel Shish-Kebab-Like Crystalline Structures", Macromolecules, 47:3409-3416.

Zhang et al. (2014) "Ultralightweight and Flexible Silylated Nanocellulose Sponges for the Selective Removal of Oil from Water", Chemistry of Materials, 26:2659-2668.

Zhou et al. (Aug. 9, 2018) "Conductive Polymer Protonated Nanocellulose Aerogels for Tunable and Linearly Responsive Strain Sensors", ACS Applied Materials & Interfaces, 10:27902-27910.

Zhou et al. (Jun. 12, 2013) "Improving Electrical Conductivity in Polycarbonate Nanocomposites Using Highly Conductive PEDOT/PSS Coated MWCNTs", ACS Applied Materials & Interfaces, 5(13):6189-6200.

Zhou et al. (2020) "Nanocellulose Aerogel-based Porous Coaxial Fibers for Thermal Insulation", Nano Energy, 68(104305):9 pages.

Zhou et al. (Feb. 14, 2014) "Probing the Role of Poly(3,4-ethylenedioxythiophene)/Poly(styrenesulfonate)-Coated Multiwalled Carbon Nanotubes in the Thermal and Mechanical Properties of Polycarbonate Nanocomposites", Industrial & Engineering Chemistry Research, 53(9):3539-3549.

\* cited by examiner

AQUEOUS EXFOLIATED GRAPHENE BY AMPHIPHILIC CELLULOSE NANOFIBRILS FOR FOLDABLE AND MOISTURE-RESPONSIVE NANOPAPER

CROSS-REFERENCES TO RELATED APPLICATIONS

This application is a U.S. national phase application of International PCT Application No. PCT/US2019/058376, filed Oct. 28, 2019 which claims priority to U.S. Provisional Application No. 62/751,339 filed Oct. 26, 2018, each of which are incorporated herein by reference in their entirety for all purposes.

BACKGROUND OF THE INVENTION

Graphene, one single layer of $sp^2$ bonded carbon atoms arranged in a hexagonal lattice, has many outstanding attributes, such as extremely high electron carrier mobility (up to 200,000 $cm^2 \cdot V^{-1} \cdot s^{-1}$), superior tensile modulus (1 TPa), high specific surface (2,630) good thermal conductivity (~5000 $W \cdot m^{-1} \cdot K^{-1}$), and ultra-high optical transmittance (~97.7%). Many important applications, i.e., electrodes, electronics and conductive coatings require large quantity graphene to be ready in a form of liquid suspensions, inks or dispersions. Thus, liquid phase exfoliation of graphene has become an important technology. However, exfoliating can be extremely challenging because the orderly graphene sheets tend to stack tightly without gaps in graphite and aggregate easily again, even after being separated, due to the abundant van der Waals interactions.

Typically, graphene can be produced by adhesive tape peeling (G. A. K., Science 2014, 324, 1530), chemical vapor deposition (L. Gao, J. R. Guest, N. P. Guisinger, Nano Lett. 2010, 10, 3512), solid-state micromechanical cleavage (K. R. Paton et al., Nat. Mater. 2014, 13, 624; Angstron Materials. https://angstronmaterials.com/product-category/graphene-and-graphene-oxide-powders/2017), and liquid phase exfoliation (M. Lotya et al., J. Am. Chem. Soc. 2009, 3611). Shearing or sonicating graphite dispersed in compatible organic liquids with surface energy very close to graphite, i.e., 70-80 mJ $m^{-2}$, guarantee well dispersed graphene products. Successful organic liquids are N-Methyl-2-pyrrolidone (NMP), dimethylformamide (DMF), 1,2-dichloroethane (DCE), o-dichlorobenzene, N-cyclohexyl-2-pyrrolidone and dichloromethane. Using NMP, for example is able to produce defect-free graphene with high electron mobility at as high concentration as 1.2 mg $mL^{-1}$. However, either using or the presence of residual organic solvents are not desired for filtering, processing or using graphene with plastics.

Therefore, aqueous dispersants, such as pyrene derivative 1-pyrenebutyrate (PB), dyes, 7,7,8,8-tetracyanoquinodimethane (TCNQ), salt, porphyrin, flavin mononucleotide (FMN), and poly(3,4-ethylene dioxythiophene)/poly(styrene sulfonate) (PEDOT/PSS) have been studied to help suspend graphene in water (J. Zhou, I. A. Ventura, G. Lubineau, Ind. Eng. Chem. Res. 2014, 53, 3539; J. Zhou, G. Lubineau, ACS Appl. Mater. Interfaces 2013, 5, 6189). Most of these dispersants stabilize graphene in water by building up double electrostatic layers on graphene to overcomes the van der Waals interaction. Typically, a dispersant lowered the electrical conductivity of the graphene produced. For example, PB decreased the electrical conductivity of obtained graphene down to 2 S $cm^{-1}$, much less than any pristine graphite (1000 S $cm^{-1}$). In addition, graphene produced was in surprisingly low concentrations, i.e., 0.1, 0.02, 0.05 mg $mL^{-1}$, from PB, TCNQ, and porphyrin, respectively. Thus, these market-available dispersants were not so effective in exfoliating graphite into graphene.

Similarly, aqeuous phase exfoliation with ionic/anionic surfactants, i.e., ultrasonicating with sodium dodecylbenzene sulfonate (SDBS) for 30 min has shown to work, but also produced an extremely low concentration of only 0.05 mg $mL^{-1}$ at best. Moreover, the substantial residual surfactant accumulated up to 35 w % after rounds of centrifuging steps dramatically decreased electrical conductivity. Substantial improved graphene concentration of 0.3 mg $mL^{-1}$ could be made using other novel surfactants, such as sodium cholate, but needing exceedingly long sonication (up to 400 h). The most obvious drawback is the accumulated surfactant layers surrounding graphene serve no beneficial functions.

Previously, nanoscale crystalline domains or nanocelluloses from agricultural biomass in the forms of cellulose nanocrystals (P. Lu, Y. Lo Hsieh, Carbohydr. Polym. 2012, 87, 564; X. Xu, H. Wang, L. Jiang, X. Wang, S. A. Payne, J. Y. Zhu, R. Li, Macromolecules 2014, 47, 3409) and nanofibrils (X. Xu, F. Liu, L. Jiang, J. Y. Zhu, D. Haagenson, D. P. Wiesenborn, ACS Appl. Mater. Interfaces 2013, 5, 2999) have been made by chemical methods and shear force (F. Jiang, Y-L. Hsieh, Carbohydr. Polym. 2013, 95, 32; F. Jiang, S. Han, Y.-L. Hsieh, RSC Adv. 2013, 3, 12366). As some nanocelluloses have impressively high intrinsic tensile strength of 1.6-6.4 GPa and modulus up to 78-114 GPa, their tensile properties are among the closest to carbon nanotubes, whose respective tensile strength and Young's modulus are estimated to be ~300 GPa and ~270-950 TPa. Previously, ca. 2 nm wide and micrometer long cellulose nanofibrils (CNFs) were made by coupled 2,2,6,6-tetramethylpiperidine-1-oxyl (TEMPO)-mediated oxidation and shear force defibrilation. These CNFs exhibited strong surface-activity by functioning as emulsifier as well as amphiphilicity when assembled into aerogels. The impressive surface-active characteristics and amphiphilicity of CNFs couple with their potentially high strength, matching carbon nanomaterials have inspired us to exploit these CNFs as ideal aqueous exfoliating and functioning agent for graphene, a potential new frontier in liquid phase exfoliation and application fields. What is needed are new surfactants and methods for separating graphite and preparing graphene. Surprisingly, the present invention meets this and other needs.

BRIEF SUMMARY OF THE INVENTION

In one embodiment, the present invention provides a method for preparing graphene comprising mixing graphite and carbon nanofibrils in a solvent to form a mixture comprising graphene at a concentration of at least 0.01 mg $mL^{-1}$.

In another embodiment, the present invention provides a nanopaper comprising cellulose nanofibrils and optionally graphene.

In another embodiment, the present invention provides a method of preparing a nanopaper comprising cellulose nanofibrils and graphene, the method comprising: (a) forming an aqueous suspension of cellulose nanofibrils and graphene; and (b) vacuum filtering the aqueous suspension.

BRIEF DESCRIPTION OF THE DRAWINGS

FIGS. 1A-1G. Aq.CNF derived from rice straw cellulose as an exfoliating agent and disperstant to exfoliate graphite into graphene.

FIGS. 2A-2G. Evidence of CNF-aided exfoliated graphene layer structure: FIG. 2A shows AFM image of graphene exfoliated by CNF; FIG. 2B shows TEM image of graphene exfoliated by CNF; FIG. 2C shows TEM SAED of graphene taken from the graphene domain and region marked with a red box in FIG. 2B; FIG. 2D shows Raman spectra of dried CNF-assisted graphene flakes deposited on alumina. FIG. 2E shows the intensity ratio of 2D/G and D/G values for graphene produced by different exfoliators to identify the exfoliation degree and defect degree; FIG. 2F shows graphitic crystalline size vs. I(D)/I(G) for exfoliated graphene. FIG. 2G 2 shows D peak deconvolution corresponding to the CNF, SDS and CMC exfoliated graphene in comparison to pristine crystal graphite.

FIGS. 3A-3F. Parameter optimization in graphite exfoliation: effect of blending speed (5-37×10$^3$ rpm, 30 min) at a fixed 32.8 g g$^{-1}$ graphite:CNF feed ratio on FIG. 3A shows graphene concentration C$_G$, FIG. 3B shows electrical conductivity of nanopaper vacuum filtered from aq. graphene/CNF, FIG. 3C shows graphene lateral dimension; effect of graphite:CNF feed ratio at a fixed 37×10$^3$ rpm on FIG. 3D shows graphene concentration with the highest graphene concentration marked by red star, FIG. 3E shows graphene yield defined as final graphene mass over initial graphite feed, with the highest graphene yield marked by the red star; FIG. 3F shows colloidal stability of aq. CNF-assisted exfoliated graphene (graphite:CNF feed ratio: 32.8 g g$^{-1}$, blending speed: 37×10$^3$ rpm) evaluated by absorbance at 450 nm of UV-vis spectra. Inset figure is UV-Vis spectra of graphene/CNF aq. suspensions measured for a series of time.

FIGS. 4A-4B. Properties of graphene.

FIGS. 5A-5F. Graphene/CNF nanopaper and application in soft robots; FIG. 5A shows image of graphene/CNF papers with 0, 15.2, 20.6 and 23.1% graphene contents; FIG. 5B shows carboxylate (—COO$^-$) charge on CNF titrated with NaOH; FIG. 5C shows photo of a shame plant's leaves that fold stimulated by touch; FIG. 5D shows cartoon illustrates the mechanism of leaf movement in a shame plant from a stimulus. The flexor and extensor cells located on respective top and bottom panels that shrink or swell from losing water or gaining water, suggesting extensor cells to be the primary effector of pulvinus bending. FIG. 5E shows cyclic bending and recovery of a 90-mm diameter and 23-μm thick graphene/CNF nanopaper (15.2% graphene) upon exposure to two human breaths at 0 and 127 s. FIG. 5F shows proposed folding mechanism of graphene/CNF nanopaper. Graphene flakes and CNFs in the nanopaper are held together by hydrophobic interaction among graphene flakes and hydrophilic and hydrogen bonding among CNFs. Upon exposure to moisture, the distances between CNF-CNF expands as hydrophilic and charge surface groups on CNFs becoming ionized by water.

FIGS. 6A-6E. Moisture triggered folding behavior of graphene/CNF nanopaper folded structures.

DETAILED DESCRIPTION OF THE INVENTION

I. General

The present disclosure describes the use of amphiphic cellulose nanofibrils (CNFs) as a novel surfactant and scalable aqueous exfoliating agent in producing graphene from graphite. It worked in combination with high-speed blending to simultaneously exfoliate and disperse graphene in water in a single step. The effectiveness of CNF exfoliation and the quality of graphene produced such as morphologies, structures (defect degree, layer number) and electrical conductivities were evaluated. The obtained aqueous suspensions were fabricated into thin, flexible, and light-weight graphene/CNF papers by vacuum filtration and evaluated for their moisture-responsive behaviors.

Aqueous exfoliation in the presence of amphiphilic CNFs has shown to be highly efficient in producing high quality, few defect graphene, using high-shear blending, a simple, widely accessible and scalable process Amphiphilic CNFs function efficiently by adhering their hydrophobic surfaces to graphite, while as the hydrophilic and charged CNF surfaces help to disperse CNF-bound graphene in aqueous media and the surface charged carboxylates stabilize the CNF-bound graphene by Coulomb repulsion. In some embodiments, aqueous suspensions with graphene concentration up to 1 mg mL$^{-1}$ and a graphene yield of 84.2% have been achieved, superseding values reported in protocols using surfactants and approaching those exfoliated in organic solvent NMP. In certain embodiments, graphene/CNF nanopaper containing 15.2 to 23.1% graphene and in 8 to 23 μm thickness has demonstrated swift moisture responsive deformation of folding or bending motions and instantaneous recovery from the absence of moisture stimuli, mimicking the closing-opening behavior of shame plant or motion of soft robots. For the first time to our knowledge, amphiphilic CNFs prepared by coupled TEMPO-blending have shown to be robust exfoliating and dispersing agent for graphene as well as responsible for stimulus-acceptor characteristics of graphene/CNF, responsive to moisture stimuli.

Non-limiting embodiments of the CNFs and the applications disclosed herein include, but are not limited to:
(1) Amphiphilic cellulose nanofibrils (CNFs) serve as an amphiphile by adhering its hydrophobic sides to hydrophobic graphite via Van der Waals interactions. Negative carboxylate charges, i.e., —COONa, help disperse and stabilize CNF-bound graphene sheets in water, preventing reaggregation.

(2) Graphene to initial graphite loading, or graphene yields, can be tuned by optimizing graphite-to-CNF mass ratios (0.22-32.81 g g$^{-1}$)

(3) Graphene concentration in water can be tuned between 0.3-1.0 mg ml$^{-1}$. The highest concentrations of graphene include an aqueous dispersion up to 1.0 mg ml$^{-1}$, e.g., obtained by blending 0.1 g graphite and 0.4572 g CNFs at a high-speed mechanical shearing of 37,000 rpm for 5-30 min.

(4) Raman showed that sp$^2$ domain sizes (internal area without defects) in graphene exfoliated by CNF have crystalline sizes of 34.1 nm, showing similar crystalline size (33.8 nm) as those exfoliated using surfactant SDS.

(5) The method of exfoliation described herein is a mild, aqueous, time-efficient, versatile and highly up-scalable approach. It is also use as a method to exfoliate other two-dimensional materials, such as boron nitride, transition metal dichalcogenide, etc.

(6) Vacuum-filtrated CNF/graphene nanopapers (with graphene content ranging from 15.2-23.1 wt. %) have a sheet resistance ranging from 1.03-6.73 kohm sq$^{-1}$ and a conductivity ranging from 5.96-94.49 S m$^{-1}$.

(7) Vacuum-filtrated CNF/graphene paper can be actuated by moisture, showing motions of folding, bending and crawling that makes this graphene/CNF paper a novel candidate to be a soft robot.

(8) For the first time, CNF is found to function as a stimulus-acceptor, e.g., it responds to moisture or humidity changes from environment owed to its high hygroscopicity. The hygroscopic nature is believed to be enabled by a high carboxylate content (~1.3 mmol g$^{-1}$) to C$_6$ sites in nanocellulose by a TEMPO oxidation.

(9) CNF-bound few layer graphene may be used to provide graphene-based electronics a high flexibility including foldability, bendability, etc. CNF is a natural filament with these physical characteristics.

(10) CNF/graphene may be useful as a touching sensing material for future implications in moisture sensing, vacuum degree detection, soft robots, and human-machine interfaces.

As producing large quantities of high-quality graphene is necessary for wide range of applications and commercialization, highly robust aqueous exfoliation using biologically derived nanocellulose presents a significant step in that direction. The availability of aqueous-phase exfoliated graphene in high quality, yield and concentration is attractive as it may be engineered into devices via filtration, casting, ink-jet printing and roll-to-roll manufacturing. Hence, the present disclosure is expected to facilitate the transition from processing of high-efficiency laboratory scale devices to industrial manufacturing ones.

II. Definitions

Unless specifically indicated otherwise, all technical and scientific terms used herein have the same meaning as commonly understood by those of ordinary skill in the art to which this invention belongs. In addition, any method or material similar or equivalent to a method or material described herein can be used in the practice of the present invention. For purposes of the present invention, the following terms are defined.

"A," "an," or "the" as used herein not only include aspects with one member, but also include aspects with more than one member. For instance, the singular forms "a," "an," and "the" include plural referents unless the context clearly dictates otherwise. Thus, for example, reference to "a cell" includes a plurality of such cells and reference to "the agent" includes reference to one or more agents known to those skilled in the art, and so forth.

"Graphene" refers to a carbon allotrope having a single layer of carbon atoms forming a 2-dimensional hexagonal lattice where each carbon atom forms a vertex. Graphene is the structural element of other carbon allotropes such as graphite, carbon nanotubes, Buckyballs, and charcoal, among others. The graphite allotrope of carbon is composed of layers of graphene stacked one on top of another and are held together via van der Waals forces.

"Carbon nanofibrils" refers to nanofibrils comprising carbon. The nanofibrils may be crystalline in either rod-like or fibril-like forms with nanometer scale lateral dimensions and hundreds to thousands of nanometers in length.

"Cellulose nanofibrils" (CNF) refers to a type of nanocellulose wherein the nanofibrils are formed from cellulose. The cellulose may be chemically modified or unmodified. Nanocellulose refers to a relatively crystalline cellulose in either rod-like or fibril-like forms with nanometer scale lateral dimensions and hundreds to thousands of nanometers in length.

"Nanopaper" refers to a membrane or thin film, which may or may not be magnetic. The nanopaper of the present invention may be hygroscopic and may comprise cellulose and optionally graphene.

"Responsive" refers to an action which occurs in reaction to a stimulus. For example, the nanopaper of the present invention can be responsive to an environmental stimulus by shrinking, swelling, folding over, or crawling across a surface.

"Solvent" typically refers to a liquid that dissolves water-soluble and water-insoluble compounds. The solvent of the present invention can be used to dissolve cellulose and/or graphene, or analogues thereof. Exemplary solvents useful in the present invention include, but are not limited to water, alcohols, acids, polyols and other water-miscible organic solvents such as propylene carbonate, N-methyl pyrrolidone, di-methyl sulfoxide and di-methyl formamide.

"Weight ratio" refers to the ratio of two different compounds by the mass. For example, if a compound A has a mass of 5 grams, and a compound B has a mass of 10 grams, the weight ratio can be reported as 1:2.

"Combined weight" refers to the sum of the weights of one or more compounds referenced. This value may be reported as mass, weight, or percentage based on the total mass/weight of the mixture.

"Weight percentage" refers the percentage by weight of a compound compared to the total weight of the mixture, wherein the mixture can be a solid, liquid, or gas. For example, the graphene weight percentage of a graphene and cellulose nanofibril mixture, is determined by the amount of graphene in the mixture, divided by the total weight of the graphene and cellulose nanofibril mixture, multiplied by 100.

"Lateral dimension" refers to the width of an object.

"Aqueous suspension" refers to a heterogeneous mixture that contains solid particles sufficiently large for sedimentation in an aqueous solution.

III. Graphene

In some embodiments, the present invention provides a method for preparing graphene comprising mixing graphite and carbon nanofibrils in a solvent to form a mixture comprising graphene at a concentration of at least 0.01 mg mL$^{-1}$.

The solvent useful in the method of the present invention can be any solvent known by one of skill in the art. For example, the solvent can be an organic solvent or an inorganic solvent. Organic solvents include but are not limited to tert-butanol, ethanol, dichlormethane, ethyl acetate, dimethylformamide, dimethylsulfoxide, acetone, toluene, benzene, hexane, cyclohexane, and pentane. Inorganic solvents include, but are not limited to water, hydrogen peroxide, ammonia, carbon tetrachloride, acids, and bases. In some embodiments, the solvent comprises water.

The carbon nanofibrils useful in the method of the present invention can be any carbon nanofibril known by one of skill in the art. For example, the carbon nanofibril can comprise carbon-based polymers, carbon dots, carbon nanotubes, and/or cellulose. In some embodiments, the carbon nanofibrils comprise cellulose nanofibrils.

The weight ratio of graphite to carbon nanofibrils for preparing graphene useful in the method of the present invention can be any weight ratio of graphite to carbon nanofibrils known by one of skill in the art. For example, the weight ratio of graphite to carbon nanofibrils is from about 0.2:1 to about 100:1. The weight ratio of graphite to carbon nanofibrils can be about 0.2:1, 0.5:1, 1:1, 2:1, 3:1, 6:1, 6.6:1, 7:1, 10:1, 15:1, 20:1, 33:1, 40:1, 50:1, 60:1, 70:1, 80:1, 90:1, or 100:1. In some embodiments, the weight ratio of the graphite to the carbon nanofibrils is from about 0.2:1 to about 33:1, about 0.2:1, 0.5:1, 1:1, 2:1, 3:1, 6:1, 6.6:1, 7:1, 10:1, 15:1, 20:1, or about 33:1. In some embodiments, the weight ratio of the graphite to the carbon nanofibrils is from about 1:5 to about 33:1.

The combined weight of graphite and carbon nanofibrils for preparing graphene useful in the method of the present invention can be any combined weight of graphite and carbon nanofibrils known by one of skill in the art. Suitable combined weight of the graphite and carbon nanofibril include about 0.01% to about 10% of the total weight mixture. For example, the combined weight of the graphite and the carbon nanofibrils is from about 0.1% to about 0.8%, about 0.1% to about 0.6%, or about 0.1% to about 0.4%. In some examples, the combined weight of the graphite and the carbon nanofibrils is about 0.1%, 0.12%, 0.14%, 0.16%, 0.2%, 0.24%, 0.26%, 0.3%, 0.32%, 0.35%, 0.4%, 0.45%, 0.5%, 0.55%, 0.6%, 0.65%, or 0.7% of the total weight of the mixture. In some embodiments, the combined weight of the graphite and the carbon nanofibrils is from about 0.1% to about 0.4%, about 0.1%, 0.12%, 0.14%, 0.16%, 0.2%, 0.24%, 0.26%, 0.3%, 0.32%, 0.35%, or about 0.4%, of the total weight of the mixture.

The mixture comprising graphene useful in the present invention can be at any concentration known by one of skill in the art. In some examples, the mixture comprises graphene at a concentration of at least 0.1 mg mL$^{-1}$ to about 5 mg mL$^{-1}$. For example, the mixture can comprise graphene at a concentration of at least 0.1 mg mL$^{-1}$, 0.2 mg mL$^{-1}$, 0.3 mg mL$^{-1}$, 0.4 mg mL$^{-1}$, 0.5 mg mL$^{-1}$, 0.6 mg mL$^{-1}$, 0.7 mg mL$^{-1}$, 0.8 mg mL$^{-1}$, 0.9 mg mL$^{-1}$, or 1 mg mL$^{-1}$. In some embodiments, the mixture comprises graphene at a concentration of at least 0.1 mg mL$^{-1}$. In some embodiments, the mixture comprises graphene at a concentration of at least 0.5 mg mL$^{-1}$.

The mixing of graphite and carbon nanofibril to form a mixture comprising graphene useful in the present invention can be performed using any suitable mixing method known by one of skill in the art. In some examples, mixing can include, but is not limited to, high-speed blending, sonication, using a stir bar and stir plate, or shaking with hands. The high-speed blending can be performed using a machine. In some embodiments, the mixing is performed using a high-speed blender.

IV. Nanopapers and Methods of Making

In some embodiments, the present invention provides a nanopaper comprising cellulose nanofibrils and optionally graphene.

The nanopaper useful in the present invention can have any suitable thickness known by one of skill in the art. For example, the nanopaper thickness can be between about 1 µm to about 50 µm. In some examples, the nanopaper can have thickness of from about 5 µm to about 45 µm. For example, the nanopaper thickness can be about 5, 10, 15, 20, 25, 30, 35, 40, or 45 µm. In some embodiments, the nanopaper can have a thickness of from about 5 µm to about 30 µm, about 5, 6, 8, 10, 12, 15, 18, 20, 22, 24, 26, 28, or about 30 µm. In some embodiments, the nanopaper can have a thickness of about 5 µm to about 10 µm.

The nanopaper useful in the present invention can have any suitable lateral dimension of graphene known by one of skill in the art. In some examples, the graphene lateral dimension can be from about 0.1 µm to about 10 µm, about 0.1 µm to about 5 µm, or about 0.5 µm to about 5 µm. For example, the graphene lateral dimension can be about 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, or 9.5 µm. In some embodiments, the graphene has a lateral dimension of from about 0.5 µm to about 3 µm, about 0.5, 0.6, 0.8, 1, 1.2, 1.4, 1.6, 1.8, 2, 2.2, 2.4, 2.6, 2.8, or about 3 µm. In some embodiments, the graphene has a lateral dimension of about 0.7 µm.

The nanopaper useful in the present invention can have any suitable weight percentage of graphene. In some examples, the weight percentage of graphene is from 0% to about 50%, about 0% to about 30%, about 5% to about 40%, about 10% to about 30%, or about 15% to about 25%. For example, the weight percentage of graphene can be about 1%, 2%, 5%, 10%, 15%, 20%, 25%, 30%, 35%, or 40%. In some embodiments, the weight percentage of graphene is from 0% to about 30%, about 1%, 2%, 5%, 10%, 15%, 18%, 20%, 23%, 25%, or about 30%. In some embodiments, the weight percentage of graphene is about 15% to about 25%.

The nanopaper useful in the present invention can have cellulose nanofibrils with any suitable average thickness measured by atomic force microscopy. In some examples, the cellulose nanofibrils have an average thickness of from about 0.5 nm to about 5 nm, about 0.5 nm to about 4 nm, or about 0.5 nm to about 5 nm. For example, the cellulose nanofibril can have an average thickness of about 0.5 nm, 1.0 nm, 1.5 nm, 2.0 nm, 2.5 nm, 3.0 nm, 3.5 nm, 4.0 nm, 4.5 nm, or 5 nm. In some embodiments, the cellulose nanofibrils have an average thickness of from about 0.5 nm to about 5 nm, about 0.5, 1, 1.5, 2, 2.5, 3, 3.5, 4, or about 5 nm, measured by atomic force microscopy. In some embodiments, the cellulose nanofibrils have an average thickness of about 1.5 nm The nanopaper of the present invention can respond to any suitable environmental stimulus. In some examples, the nanopaper is responsive to temperature, water, moisture, inorganic solvents, organic solvents, polar solvents, nonpolar solvents, and/or human breath.

In some embodiments, the nanopaper is responsive to temperature and water. In some examples, the nanopaper is responsive to temperature and water by shrinking, swelling, folding over, or crawling across a surface.

In some embodiments, the present invention provides a method for preparing a nanopaper comprising cellulose nanofibrils and graphene, the method comprising: (a) forming an aqueous suspension of cellulose nanofibrils and graphene; and (b) vacuum filtering the aqueous suspension.

The combined weight of cellulose nanofibrils and graphene in an aqueous suspension useful in the present invention can be any suitable combined weight of cellulose nanofibrils and graphene. In some examples, the aqueous suspension comprises about 0.1% to about 10%, about 0.1% to about 5%, about 0.1% to about 2%, or about 0.1% to about 1% combined weight of cellulose nanofibrils and graphene. For example, the aqueous suspension can comprise about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, or 10% combined weight of cellulose nanofibrils and graphene. In some embodiments, the aqueous suspension comprises about 0.1% to about 1% combined weight of cellulose nanofibrils and graphene. In some embodiments, the aqueous suspension comprises about 0.1% combined weight of cellulose nanofibrils and graphene.

Vacuum filtering the aqueous suspension in the present invention can be performed using any suitable length of time. In some examples, vacuum filtering the aqueous suspension is performed for about 1 hours to about 48 hours, about 4 hours to about 48 hours, about 6 hours to about 24 hours, or about 8 hours to about 24 hours. For example, vacuuming filtering the aqueous suspension can be performed for about 2 hours, 4 hours, 6 hours, 8 hours, 10 hours, 12 hours, 14 hours, 16 hours, 18 hours, 20 hours, 22 hours, 24 hours, or 48 hours. In some embodiments, vacuum filtering the aqueous suspension is performed for about 2 hours to about 24 hours.

In some embodiments, the present invention provides a method for preparing a nanopaper of the present invention comprising: (a) forming an aqueous suspension of cellulose nanofibrils and graphene, wherein the aqueous suspension comprises about 0.1% combined weight of cellulose nanofibrils and graphene; and (b) vacuum filtering the aqueous suspension for about 24 hours.

V. Examples

Example 1. General Experimental

Materials

Graphite flakes (49 μm particle size, Sigma-Aldrich), toluene (99.9%, Fisher Scientific), anhydrous ethanol (Fisher Scientific), sodium chlorite ($NaClO_2$, 80% purity, ACROS), acetic acid (99.7%, Fisher Scientific). potassium hydroxide (KOH, 85% purity, Sigma-Aldrich), sodium hypochlorite (NaClO, 11.9%, reagent grade, Sigma-Aldrich), 2,2,6,6-tetramethylpyperidine-1-oxyl (TEMPO, 99.9%, Sigma-Aldrich), sodium bromide (NaBr, 99.6%, Sigma-Aldrich), sodium hydroxide (NaOH, Fisher Scientific), hydrochloric acid (HCl, 1N, Fisher Scientific) were used as received. Other exfoliators were used including carboxymethyl cellulose (CMC, $M_w$=250 kDa, SD=1.2, ACROS) and sodium dodecyl sulfate (SDS, J. T. Baker) were used as received. Water was purified by Milli-Q plus water purification system (Millipore Corporate, Billerica, MA).

Cellulose was extracted from rice straw (RS, Calrose variety, 2015 harvest in the Sacramento Valley in northern California) by a three-step procedure involving 2:1 v/v toluene-ethanol extraction, NaClO leaching of lignin and NaOH removal of hemicellulose to 31.4% yield. Cellulose nanofibrils (CNFs) were produced as 0.67 wt % aq. suspension by 2,2,6,6-tetramethylpiperidine-1-oxyl (TEMPO)-mediated oxidation (5 mmol $g^{-1}$ NaClO/cellulose) followed by blending (37,000 rpm, 30 min) also previously reported. Details on measuring the blending speeds are shown in Table 1 below.

Preparing Cellulose from Rice Straw

Cellulose was extracted from rice straw (Calrose variety, 2015 harvest in the Sacramento valley in northern California) according to previous procedures (P. Lu, Y. Lo Hsieh, Carbohydr. Polym. 2012, 87, 564). Dried 30 g milled RS powder (Wiley Mini Mill, Thomas Scientific, pass 20-, 40- and 60-mesh consecutively) was loaded into a thimble and fluxed with 200 mL toluene (99.9%, Fisher Scientific) and 100 mL anhydrous ethanol (Fisher Scientific) in a Soxhlet extractor at 120° C. for 20 h. The thimble was then left in fume hood for 48 h and 50° C. oven for 24 h to evaporate toluene/ethanol. To remove hemicellulose and lignin, 7.5 g sodium chlorite ($O_2ClNa$, 80% purity, ACROS) in 1000 mL DI water at pH was adjusted to 3-4 by adding acetic acid (99.7%, Fisher Scientific). Then, it was warmed to 70° C. so RS powder was added and stirred for 5 h. Obtained slurry was filtrated and washed till pH~7. Obtained dried RS powder, 30 g potassium hydroxide (KOH, 85% purity, Sigma-Aldrich) and 600 ml water were mixed (KOH/water 5%) at 25° C. for 24 h and at 90° C. for 2 h. Obtained slurry was washed and filtrated till pH~7, then frozen by liquid nitrogen dried by lyophilized at −50° C. (FreeZone 1.0 L Benchtop Freeze Dry System, Labconco, Kansas City, Mo.).

TEMPO Mediated Defibrillated CNFs

Cellulose nanofibrils (CNFs) were prepared from RS-based cellulose employing 5 mmol sodium hypochlorite (NaClO, 11.9%, reagent grade, Sigma-Aldrich) per gram of cellulose and mechanical blending at 37,000 rpm for 30 min as reported previously (F. Jiang, S. Han, Y.-L. Hsieh, RSC Adv. 2013, 3, 12366.) In detail, 1.0 g cellulose was added into 100 mL water (purified by Milli-Q plus water purification system, Millipore Corporate, Billerica, MA) and stirred for 5 min. 2 mL of an aqueous mixture of 0.016 g 2,2,6,6-tetramethylpyperidine-1-oxyl (TEMPO, 99.9%, Sigma-Aldrich) and 0.1 g sodium bromide (NaBr, NaBr, 99.6%, Sigma-Aldrich) was added and stirred for another 5 min. Oxidation reaction was initiated by adding 3.436 mL sodium hypochlorite (NaClO, 10-15% chlorine, Sigma-Aldrich) solution drop-wisely at 20 μm/time to reach 5 mmol NaClO per gram of cellulose. The pH decreased as oxidation proceeded and was adjusted to 10±0.2 with 0.5 M sodium hydroxide (NaOH, Fisher Scientific). The oxidation reaction ended when no acid was produced, or pH ceased to lower, lasting approximately 65 min. The pH was adjusted to 7 with 0.5 M hydrochloric acid (HCl, 1N, Fisher Scientific). The suspension was centrifuged (5000 rpm, 15 min) to get precipitate, it was dialyzed against water until its conductivity was ca. 0.8 mV/cm. With addition of 150 ml water, the TEMPO-treated cellulose was defibrillated for 30 mins using a high-performance blending machine (Vitamix, 5200, Cleveland OH) operated at 37,000 rpm. Obtained TEMPO-CNF was centrifuged (1500 rpm, 15 min) again to obtain the CNF-containing supernatant which was then concentrated using a rotary evaporator. Final aqueous CNF suspension has a concentration of 0.67 wt. %.

Blending Speed

A Vitamix blender was used to complete the exfoliation process of bulk 2D graphite powders into graphene sheets. Standard procedure was conducted at a "high" dial setting, which was given a speed of 37,000 rpm from the manual came with the equipment. An average 29,423 rpm was given by the customer support of the manufacturer. Below list the other values as corrected for this blender after their rigorous experiments as well (Table 1). Dial settings at 2, 4, 6, 8, 10 & high, corresponding to an average speeds of 4,200, 10,543, 19,317, 24,010, 24,370, 29,423 rpm, respectively, were used in this study. These numbers may be abbreviated into 4.2 k, 10 k, 19 k, 24 k, 25 k, 30 k rpm in this study.

TABLE 1

Speeds for Vitamix blender (5200, 220 V 50 hz, S/N: 059184150615293423) measured with no load.

| Dial Setting | Test 1 | Test 2 | Test 3 |
|---|---|---|---|
| 1 | 1,765 | 740 | 970 |
| 2 | 5,060 | 3,090 | 4,450 |
| 3 | 10,125 | 4,860 | 7,510 |
| 4 | 12,975 | 7,225 | 11,430 |
| 5 | 16,675 | 13,160 | 16,350 |
| 6 | 20,200 | 18,750 | 19,000 |
| 7 | 23,400 | 23,460 | 22,880 |
| 8 | 23,850 | 24,380 | 23,800 |
| 9 | 24,060 | 24,650 | 24,140 |
| 10 | 24,080 | 24,690 | 24,340 |
| High | 29,190 | 29,890 | 29,190 |

Exfoliation by Nanocellulose

Aq. CNF suspension (0.67 w %, 22.75 g) was mixed with graphite flakes (5 g, 100-mesh, Sigma Aldrich) and additional water (77 g) to prepare 50 mg mL$^{-1}$ (5 w %) aq. graphite suspension then blended using a high-speed blender (Vitamix 5200, Cleveland OH) for 5 to 60 min. Upon settled for 24 h, the supernatant was centrifuged (Eppendorf, Centrifuge 5804 R) at 1500 rpm for 15 min, then at 11,000 rpm for 60 min to collect the exfoliated graphene in the final aq. supernatant. For comparison, graphite flakes were also exfoliated using carboxymethyl cellulose (CMC), sodium dodecyl sulfate (SDS) following the same procedures described above. To optimize graphene yield, blending speed and CNF:graphite feed ratio were varied, one at a time. First, original aq. graphite-CNF suspension, 5 g:0.1524 g CNF:graphite ratio, was blended at varying speeds from 5×10$^3$ to 37×10$^3$ rpm. Then, the CNF:graphite feed ratios were reduced from 32.8 to 0.2 by lowering graphite while increasing CNF concentrations from 5 g:0.1524 g to 0.1 g:0.4572 g and blended at 37×10$^3$ rpm for 30 min (Table 2).

TABLE 2

Exfoliation of graphite by CNFs at varied graphite:CNF feed, mass ratios and total concentration at constant blending (37 × 10$^3$ rpm, 30 min).

| Sample | a | b | c | d |
|---|---|---|---|---|
| Graphite:CNF feed [a] | 5 g:0.1524 g | 1 g:0.1524 g | 0.3 g:0.3049 g | 0.1 g:0.4572 g |
| Graphite:CNF ratio (g g$^{-1}$) | 32.8 | 6.6 | 1.0 | 0.2 |
| Aq. (CNF + graphene) concentration (w %) | 0.14 | 0.16 | 0.26 | 0.31 |

[a] dry mass of CNF from aq CNF (0.67 w %).

Fabrication of Graphene/CNF Nanopaper

Aq. graphene/CNF suspension (0.1%, 98 g) with 0.098 g graphene/CNF solid mass weight was vacuum-filtrated for 24 h through a 90-mm diameter polycarbonate filter with 0.2 μm pore size membrane (Wheaton) attached to Wheaton 90-mm filtration assemblies.

The height of CNFs was imaged by atomic force microscopy (AFM). Aq. CNF suspension (10 μL, 0.0005%) was deposited onto a freshly cleaved hydrophilic mica surface, air-dried, scanned (Asylum-Research MFP-3D) in air under ambient condition using tapping mode with OMCL-AC160TS standard silicon probes. The scan rate was set to 1 Hz, and image resolution is 512×512 pixels. The height images and profiles were processed with Igor Pro 6.21 loaded with MFP3D 090909+1409, and the thickness was determined from ca. 100 individual nanofibrils and the mean and standard deviation reported.

The width and length of CNFs were imaged by transmission electron microscopy (TEM) on a JEOL2100F electron microscope (JEOL). Aq. CNF suspension (5 μL, 0.0001 wt %) was deposited onto glow-discharged carbon-coated TEM grids (300-mesh copper, formvar-carbon, Ted Pella Inc., Redding, CA) with the excess liquid being removed by blotting with a filter paper after 10 min. The specimens were then negatively stained with 2% phosphotungstic acid (PTA) solution for 2 s 5 times, each time blotted with a filter paper from grid bottom to remove excess staining solution and allowed to dry at 50° C. for 10 s. The samples were observed at a 40 or 80 kV accelerating voltage. The widths and lengths of CNFs were measured from ca. 200 individual nanofibrils using an image analyzer (ImageJ, NIH, USA) to calculate the mean and standard deviation.

Raman spectra were collected using a RM1000 Raman spectrometer (Renishaw plc) on aerogels using a 514.5 nm Argon ion laser. UV-vis spectra to characterize suspension's stability was done on a UV-vis spectrophotometer (Evolution 600, Thermo Scientific). Surface tension (γ) values of aq. CNF suspensions were measured by a K10 Kruss tensiometer using the Wilhelmy plate method using a platinum plate and derived using below equation, where F is the force in mN m$^{-1}$, L is the wetted length of measuring plate. The γ of aq. CNF suspensions at different CNF concentration were calculated from wetting forces (F) measured using a platinum plate with (L) interfacial length and zero contact angle (θ). The platinum plate was cleaned by burning off residual CNF after each measurement using a Bunsen burner.

$$\gamma = \frac{F}{L \cdot \cos\theta} (\theta = 0°)$$

CNF/graphene compositions were determined by heating the dried graphene/CNF films at 10° C. min$^{-1}$ to 500° C. using a thermogravimetric analyzer (TGA-50, Shimadzu Company). Graphene contents in graphene/CNF films were determined by subtracting residual mass of graphene/CNF by residual mass of CNF, both at 500° C.

Example 2. Morphologies and Use of CNFs as a Dispersant for Graphite

Figure 1:
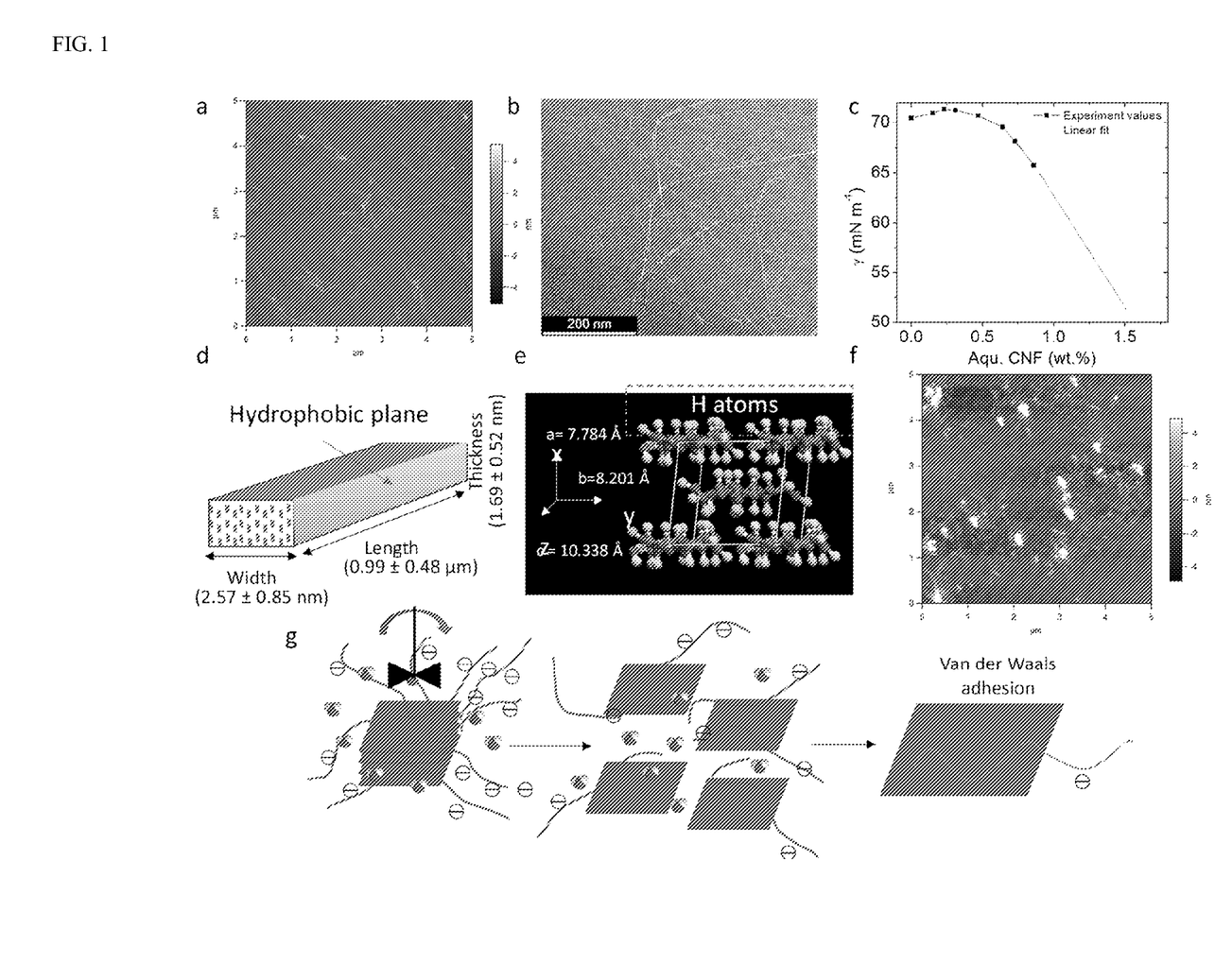
FIG. 1A shows AFM image of 0.0001% CNF on mica.
FIG. 1B shows TEM image of 0.0001% CNF on glow-charged carbon coated copper grid.
FIG. 1C shows surface tension ($\gamma$) of aq. CNF at different CNF concentrations.
FIG. 1D shows a simplified model showing idealized arrangement of cellulose molecules (each molecule as one grey rectangle block) to exposure (200) hydrophobic and (110) or (1$\bar{1}$0) hydrophilic planes in the height and top or bottom surfaces.
FIG. 1E shows cellulose Iβ monoclinic unit cell viewed from z-direction, plane (200) is on top of the cell. Model was adopted from Crystallography Open Database.
FIG. 1F shows AFM images of 10 μL 0.001% graphene/CNF on mica. Graphene/CNF exfoliated from 32.8 g g$^{-1}$ graphite:CNF (blending at 37×10$^3$ rpm, supernatant after final centrifuged at 11,000 rpm for 60 min)
FIG. 1G. shows a scheme of exfoliation of graphite represented by multi-layers of 2D graphene sheets into single layer graphene by CNFs.
Figure 7:
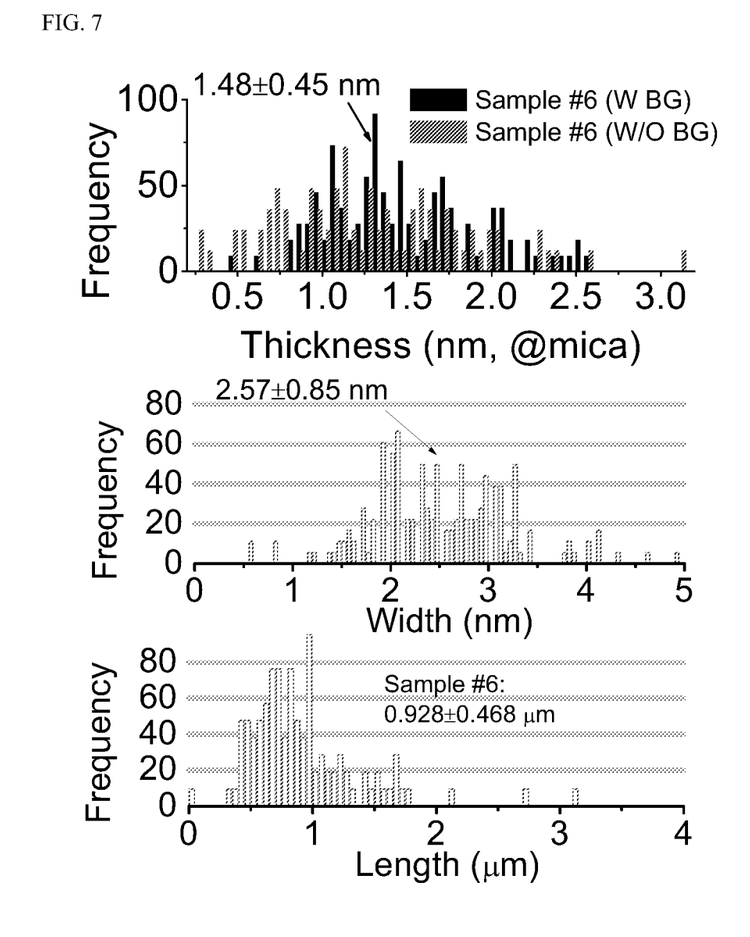
FIG. 7 shows height, width and length histograms of CNFs.

The CNFs synthesized by TEMPO-mediated oxidation of rice straw cellulose were measured to be 1.69±0.52 nm thick (n=100) by AFM (FIG. 1A, FIG. 7), and 2.57±0.85 nm wide and 0.99±0.48 µm long (n=200) by TEM (FIG. 1B). At a concentration of 0.67 wt %, aq. CNF was highly viscous due to their very fine lateral dimensions and high length to width/thickness aspect ratios, up to 586. All these observations are consistent with our prior work. As both mica used for AFM and glow discharged grid for TEM are hydrophilic, the wider surfaces that preferentially lay on these hydrophilic AFM and TEM sample supports are assumed to be hydrophilic (110) or (1$\bar{1}$0) planes and the smaller height in the thickness direction to be the hydrophobic (200) plane (FIG. 1D). This is illustrated by viewing the cellulose Iβ monoclinic unit cell from z-direction where a surface full of axial —H atoms is present on top of the cell (FIG. 1E). In the presence of CNFs, the surface tension (γ) of water (70.4 mN m$^{-1}$) was first increased slightly to 71.3 mN m$^{-1}$ with 0.23 w % CNF, then decreased to 65.7 mN m$^{-1}$ with further increases in CNF concentrations to 0.86 w % CNF (FIG. 1C). Intriguingly, water surface tension would be extrapolated to as low as 51 mN m$^{-1}$ if aq. CNF could be concentrated to 1.5 w % that is not feasible with the viscosity. The inherently high watery is due to the abundance of hydrogen bonding among water molecules. The very slight initial γ increase of 0.23 w % CNF is curious, indicating the presence of CNF in fact increases inter-molecular attraction in diluted aq. CNF solutions. In theory, CNF can hydrogen bond with water as well as with each other. In addition, CNF can associate with each other via hydrophobic interaction. The slight γ increases in these diluted aq. CNF solutions suggest that CNFs optimize inter-molecular attraction among water and CNF. With further increasing CNF concentrations, the increasing CNF-water association reduces water-water attraction. Therefore, aq. CNFs behave like surfactants owed to their anisotropic crystalline surfaces, consistent with prior observation of the emulsifying ability of the same aq. CNF. 10 µL 0.001% graphene/CNF droplets deposited on 9.9-mm-diameter mica disc spread instantaneously and completely cover the surface, indicative of the overall hydrophilic nature of graphene/CNF. AFM images clearly showed the association of multiple CNFs with each individual graphene flake (FIG. 1F). The aqueous dispersibility, hydrophilic characteristic of graphene/CNF, and individual graphene/CNF domains observed are all supportive of the notion that exfoliation of graphite into graphene by CNF works as the hydrophobic 200 plane on CNF surfaces interact with hydrophobic graphite surfaces whereas the hydrophilic 110 or 1$\bar{1}$0 planes and surface charges on the exposed CNF surfaces function to disperse and peel off the exfoliated graphene sheets (FIG. 1G).

Example 3. Quality of Exfoliated Graphene

Figure 2:
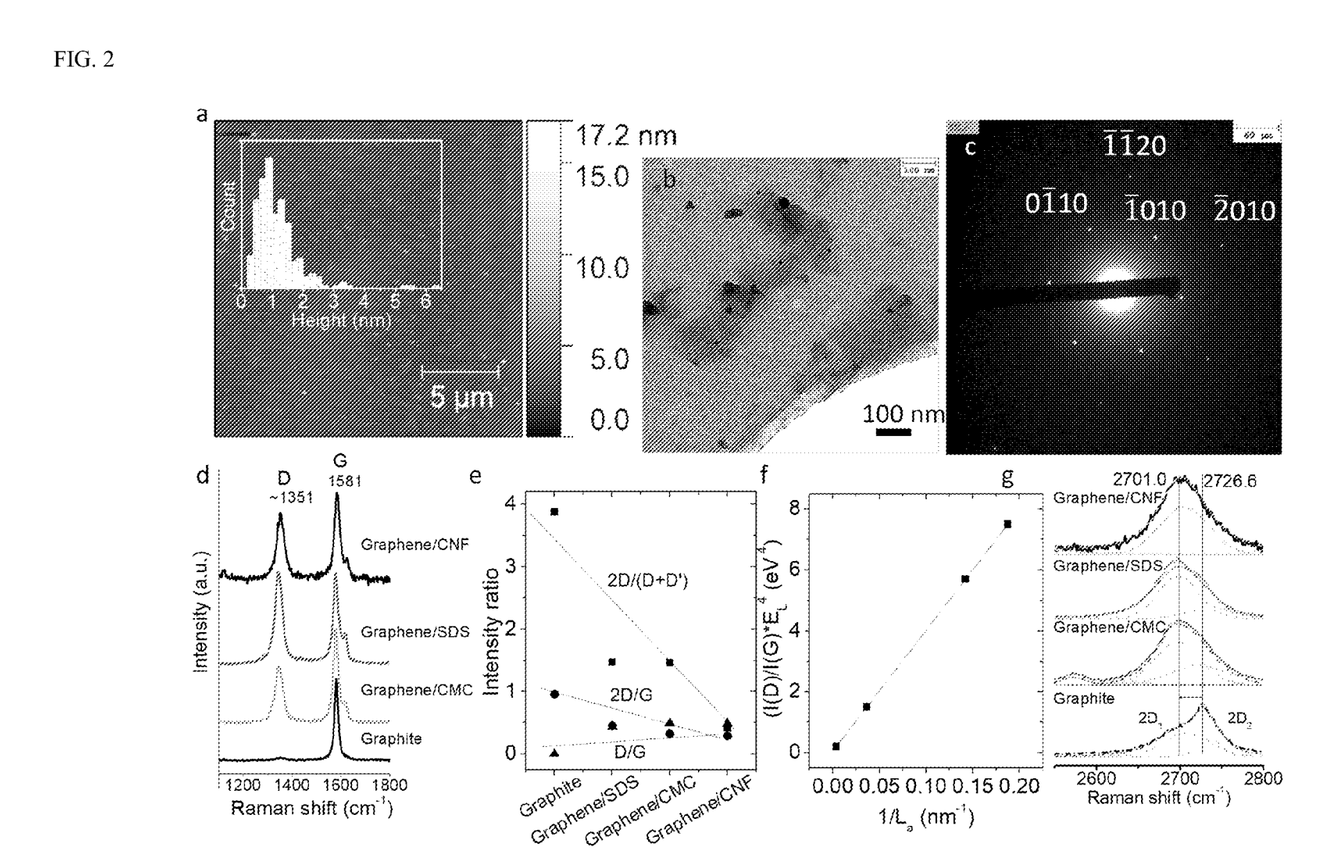

The exfoliated graphene sheets had an average 1.15 nm thickness determined by AFM (FIG. 2A, inset), but varied in thickness as shown by the different shades in TEM images (FIG. 2B). Based on the reported monolayer thickness of 0.335 nm, approximately 5% of the exfoliated graphene were in monolayer (<0.39 nm), 19% in two layers (0.4-0.6 nm), 26% graphene in triple layer (0.7-0.9 nm) and 47% in multilayers (1.0-10.0 nm). Only 3% graphene has over 10 layers or so called un-exfoliated graphitic platelets. At the same 0.15% aq. dispersant concentration, graphene exfoliated by CNF was much higher than SDS. Selected area electron diffraction pattern on an arbitrary area in FIG. 2C showed typical graphene crystalline planes, i.e., 0$\bar{1}$10, $\bar{1}$010, $\bar{2}$010, and $\bar{1}\bar{1}$20. The diffraction spots on the inner circle are obviously brighter than the outer circle spots, indicating some graphene to be monolayer. Therefore, 50% of the CNF-exfoliated graphene are three layers or less and nearly the other half are four layers or more.

The D, G and 2D Raman peaks (FIGS. 2D-2G) change in shape, position and relative intensity with number of graphene layers. D peak at ~1350 cm$^{-1}$ comes from sp$^2$ carbon rings near a graphene edge or a defect in the carbon lattice, G peak at ~1580 cm$^{-1}$ represents an in-plane vibrational mode of the sp$^2$ hybridized carbon atoms, 2D band at ~2700 cm$^{-1}$ is the second order of zone-boundary phonons. Defects increase D peak intensity and cause a concomitant increment in a D/G peak intensity I(D)/I(G), comparing CNF-dispersed graphene and the bulk graphite in FIG. 2D. In detail, the I(D)/I(G) is 0.48 for graphene exfoliated by CNF (FIG. 2E), indicating a low defect level similar to graphene exfoliated by NMP. and far lower than the high 0.98 ratio for defected oxidized graphene.

Meanwhile, the ratio of I(2D)/I(G) is used to determine the layer number of graphene. It is reported that when value of 3-4 indicates monolayers, value less than 0.5 indicates few layers, value of one is for bilayer. In this study, CNF-exfoliated graphene has an intensity ratio of one (Table 3), suggesting presence of large number of bilayers. I(2D)/I(D+D') (D' is the minor peak on the right shoulder at G peak) suggests the level of electrical conductivity. From this data, it is expected that graphene exfoliated by CNFs has a lower intrinsic electrical conductivity compared to graphite due to the defects (edges) generated by the aggressive exfoliation process.

TABLE 3

Raman data of various exfoliated graphene by using different exfoliators.

| Sample | I(D)/A(G) | I(2D)/I(G) | I(2D)/I(D + G) | $L_a$ (nm) | $1/L_a$ (nm$^{-1}$) | I(D)/I(G)*$E_L^4$ (eV$^4$) |
|---|---|---|---|---|---|---|
| Graphite | 0.19126 | 0.7 | 0 | 86.8 | 0.011521 | 0.38866 |
| Graphene/CMC | 0.43655 | 0.9 | 2.2 | 38.0 | 0.026298 | 0.88712 |
| Graphene/SDS | 0.49176 | 0.9 | 2.3 | 33.8 | 0.029623 | 0.99931 |
| Graphene/CNF | 0.48676 | 1 | 2.3 | 34.1 | 0.029322 | 0.98916 |

I(D)/I(G) ratio was used to show the in-plane average size ($L_a$) of carbon sp$^2$ domain (internal area without edges, foreign atoms or defected holes). The equation is expressed by Tuinstra-Koenig relation:

$$\frac{I(D)}{I(G)} = C(E_l)/L_a$$

Where empirical constant C(E$_l$) depends on energy of laser. Here 514.5 nm laser was used so E$_{laser}$=2.41 eV. Cancado et al. deduced am empirical equation between the L$_a$ and integrated intensity:

$$L_a(nm) = \frac{560}{E_l^4}\left(\frac{I(D)}{I(G)}\right)^{-1}$$

We plotted $I(D)/I(G)*E_L^4$ (eV$^4$) vs. $1/L_a$ in FIG. 2F. Comparing graphene exfoliated by CNF and SDS, they have crystalline sizes of 34.1 nm and 33.8 nm, respectively, showing they have similar sp$^2$ crystalline domains (Table 3). which corresponds to the I(D)/I(G) results as shown in FIG. 2E.

Lastly, FIG. 2G shows a significant change in the shape (i.e., $2D_1$, $2D_2$) and intensity (relative intensity to G peak) of the 2D peak of graphene compared to bulk graphite. Single-layer graphene was reported having a single, sharp 2D peak, roughly four times more intense than the G peak. In this study, the 2D peak in graphite consists of two components $2D_1$ and $2D_2$, roughly 3/10 and 2/10 of G peak at 2706.9, 2737.6 cm$^{-1}$, respectively. For graphene exfoliated by CNF, the highest $2D_1$ peak increased its intensity up to 7/10 of G peak, the $2D_2$ component almost diminished. In appearance, the full 2D peak of graphene exfoliated by CNF upshifted by ~25 cm$^{-1}$ compared to graphite. These evidences attest that CNF exfoliates graphite into graphene efficiently but not all in single layers, which are consistent with AFM and TEM results. Conclusively, CNF works as a dispersant with similar exfoliation effect as surfactant SDS, but better and unlike CMC that adheres to anything and forms gel easily, thus difficult to remove from graphene.

Example 4. Exfoliation Conditions and Attributes of Graphene/CNF

Figure 3:
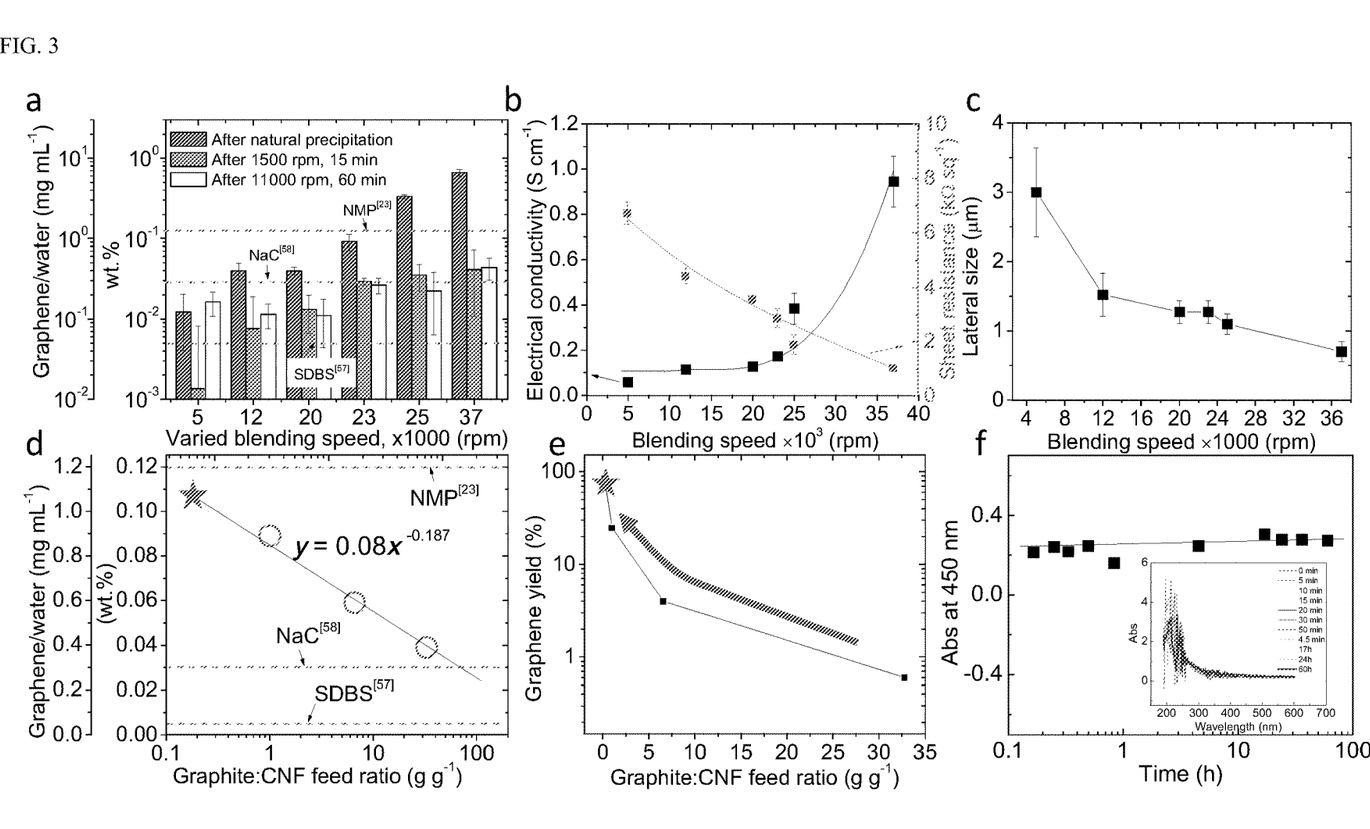

The CNF-aided exfoliation of graphite into graphene was further optimized by varying the blending speed and initial graphite to CNF feed ratio. Varying blending speeds from 5 to 37×10$^3$ rpm were applied to the initial protocol, i.e., 50 mg mL$^{-1}$ aq. graphite and 32.8 g g$^{-1}$ graphite:CNF feed ratio. Graphene concentrations ($C_G$, excluding CNF, in mg mL$^{-1}$) in the supernatant from settling for 24 h and centrifugation at 1.5×10$^3$ rpm then at 11×10$^3$ rpm were compared (FIG. 3A). At a fixed 32.8 g g$^{-1}$ initial graphite:CNF feed ratio, graphene $C_G$ exfoliated increased nearly linearly with blending speed, except for at 12×10$^3$ rpm, and peaked at 0.5 mg mL$^{-1}$ graphene concentration at 37×10$^3$ rpm. The graphene exfoliated $C_G$ values were similar, except for the least blended, between the two levels of centrifugations, indicating settling for 24 h and the first round of centrifugation at 1.5×10$^3$ rpm for 15 min were sufficient to precipitate larger graphene. Electrical conductivity of vacuum-filtrated graphene/CNF nanopaper from blending at 5-25× 10$^3$ rpm remained low at 0.1 S cm$^-$ (FIG. 3B black line), but that blended at ~37×10$^3$ rpm significantly raised to 0.94 S cm$^{-1}$, corresponding to a sheet resistance of 1.03±0.12 kΩsq$^{-1}$ (FIG. 3B red line, Table 4). Since there is no significant difference in in the concentrations of graphene $C_G$, the increased conductivity is believed to be associated with graphene attributes, i.e., sizes and layers. The lateral dimensions of graphene exfoliated reduced drastically with the initial increases in blending speeds, lowering from 3 μm at 5×10$^3$ rpm, 1.4 μm at 12×10$^3$ rpm, to 0.7 μm at the maxima at 37×10$^3$ rpm (FIG. 3C). The 0.7 μm lateral size was comparable to the 0.5 μm value reported for graphene exfoliated by surfactant SDBS. Therefore, CNF exfoliated more efficiently into graphene whose lateral dimensions reduced with increasing blending speed. The electrical conductivity of the resulting graphene was only improved with the 0.7 μm size exfoliated at 37×10$^3$ rpm. Even the most conductive graphene/CNF nanopaper is far less conductive than graphite (3000 S cm$^{-1}$) as expected due to existence of insulating CNFs.

TABLE 4

Electrical conductivity of various CNF/graphene films prepared by blending graphite at 32.8 g g$^{-1}$ graphite:CNF feed ratio for 30 min. V2-10 denotes variation in blending speed. V11 = 37 × 10$^3$ rpm.

| Dial at blending | Sheet resistance (kohm sq$^{-1}$) | Standard deviation | Conductivity (S m$^{-1}$) | Standard deviation |
|---|---|---|---|---|
| v2[a] | 6.73 | 0.40 | 5.96 | 0.36 |
| v4 | 4.43 | 0.29 | 11.50 | 0.78 |
| v6 | 3.57 | 0.15 | 12.76 | 0.55 |
| v8 | 2.87 | 0.35 | 17.33 | 2.18 |
| v10 | 1.90 | 0.36 | 38.46 | 6.88 |
| v11 | 1.03 | 0.12 | 94.49 | 11.29 |

[a]V2-11 denotes dial settings which corresponds to .2k, 10k, 19k, 24k, 25k, 30k in Table 1.

The effect of initial graphite:CNF feed ratio was then varied from 32.8 to 0.2 g g$^{-1}$ at the optimal blending speed of 37×10$^3$ rpm for 30 min (Table 5). With increasing CNF proportion or decreasing graphene:CNF feed ratio in the initial suspensions, the graphene concentration $C_G$ increased from 0.3 to 1.0 mg mL$^{-1}$ (FIG. 3D), showing the positive effect of the exfoliating agent, CNFs. Higher graphene concentration means higher solid mass in liquid and is advantageous for handling, processing as well as applications. In the meantime, graphene yield defined as final graphene mass over initial graphite feed, increased to 84.2% with increasing CNF in the feed or reducing graphite:CNF ratio at 0.2 g g$^{-1}$ (FIG. 3E). By defining $C_G$ as graphene concentration in water, $Ø_{G:CNF}$ as graphite:CNF feed ratio, the graphene exfoliated into aqueous media $C_G$ is dependent on $Ø_{G:CNF}$, i.e. $C_G \cdot Ø_{G:CNF}^x$, where x≈−0.187. This processing showed a high tunability in product qualities, i.e., conductivity (graphene) or strength/film forming ability (CNF).

TABLE 5

Optimization for exfoliation of graphene by CNFs with varied graphite:CNF loadings at blending speed of 37 × 10$^3$ rpm for 30 min.

| Sample | a | b | c | d |
|---|---|---|---|---|
| Graphite:CNF feed ratio (g g$^{-1}$) | 32.8 | 6.6 | 1.0 | 0.2 |
| Graphene in graphene/CNF (wt. %)[a] | 23.1 | 20.6 | 17.8 | 15.2 |
| Graphene in supernatant (mg mL$^{-1}$)[b] | 0.3 | 0.6 | 0.9 | 1.0 |
| Graphene:CNF ratio (g g$^{-1}$) | 0.30 | 0.26 | 0.22 | 0.18 |
| Graphene yield (to initial loading, %) | 0.5 | 4.0 | 24.8 | 84.2 |

[a]Values were determined by TGA: residual mass of graphene/CNF (at 500° C.).
[b]Graphene + CNF concentration in water were determined by weighting the mass of 1 mL graphene/CNF suspension before and after drying at 50° C. for 12 h. Graphene in supernatant were calculated from data in graphene/CNF (wt. %) by 1 mg mL$^{-1}$ = 0.1 wt. %.

Aq. graphene absorbed strongly, but irregularly in the 200-250 nm UVC range (FIG. 3F inset). The stability of the exfoliated graphene/CNF over time was monitored by the optical absorbance at 450 nm. The graphene suspensions blended at 37×10$^3$ rpm for 30 min remained stable and did not settle for up to 60 h (FIG. 3F). In general, having a stable graphene dispersion is crucial as it allows controlled deposition to create free standing graphene films.

Figure 4:
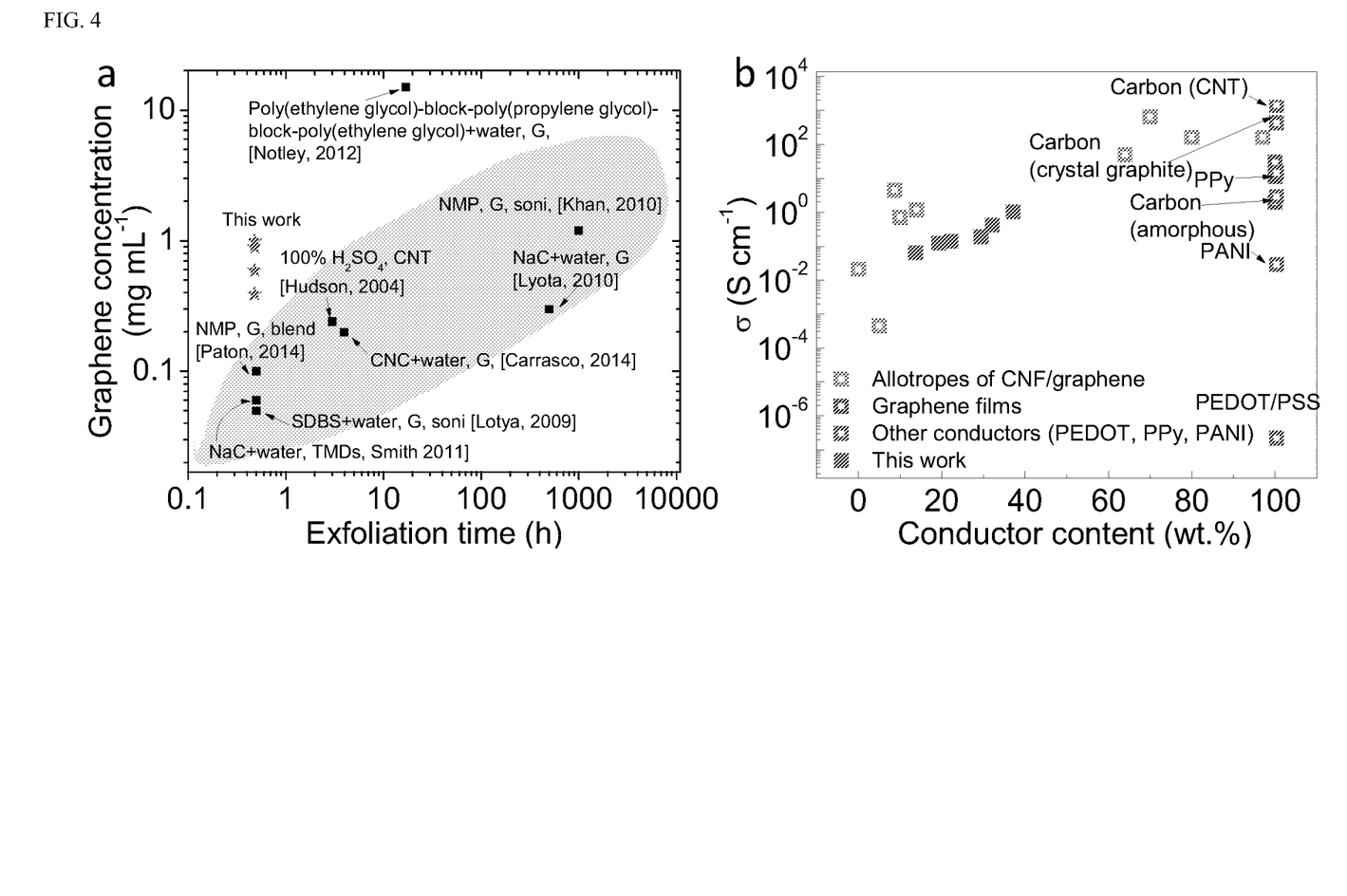
FIG. 4A shows graphene concentrations versus exfoliation time plot including data reported in this work and from literature.
FIG. 4B shows recent advance in electrical properties of conductive CNFs.

Aq. graphene suspension produced by CNF-aided exfoliation of graphite has a concentration up to 1 mg mL$^{-1}$, much higher than those aided by ionic surfactants, i.e., 0.05 mg mL$^{-1}$ by SDBS, 0.3 mg mL$^{-1}$ by NaC and very close to the highest 1.2 mg mL$^{-1}$ value reported using NMP,[7] that required exceedingly long 460-h sonication (23 W), however. Therefore, this simple, short (only 30 min) and aq. based CNF-aided exfoliation approach not only produces high concentration (1 mg mL$^{-1}$), high quality graphene (50% 3 layers of less, average 7 μm size) in high yield (84.2%), suppressing all other protocols reported (FIG. 4A, Table 5).

Example 5. Application of Graphene/CNF Nanopaper in Soft Robots

Figure 5:
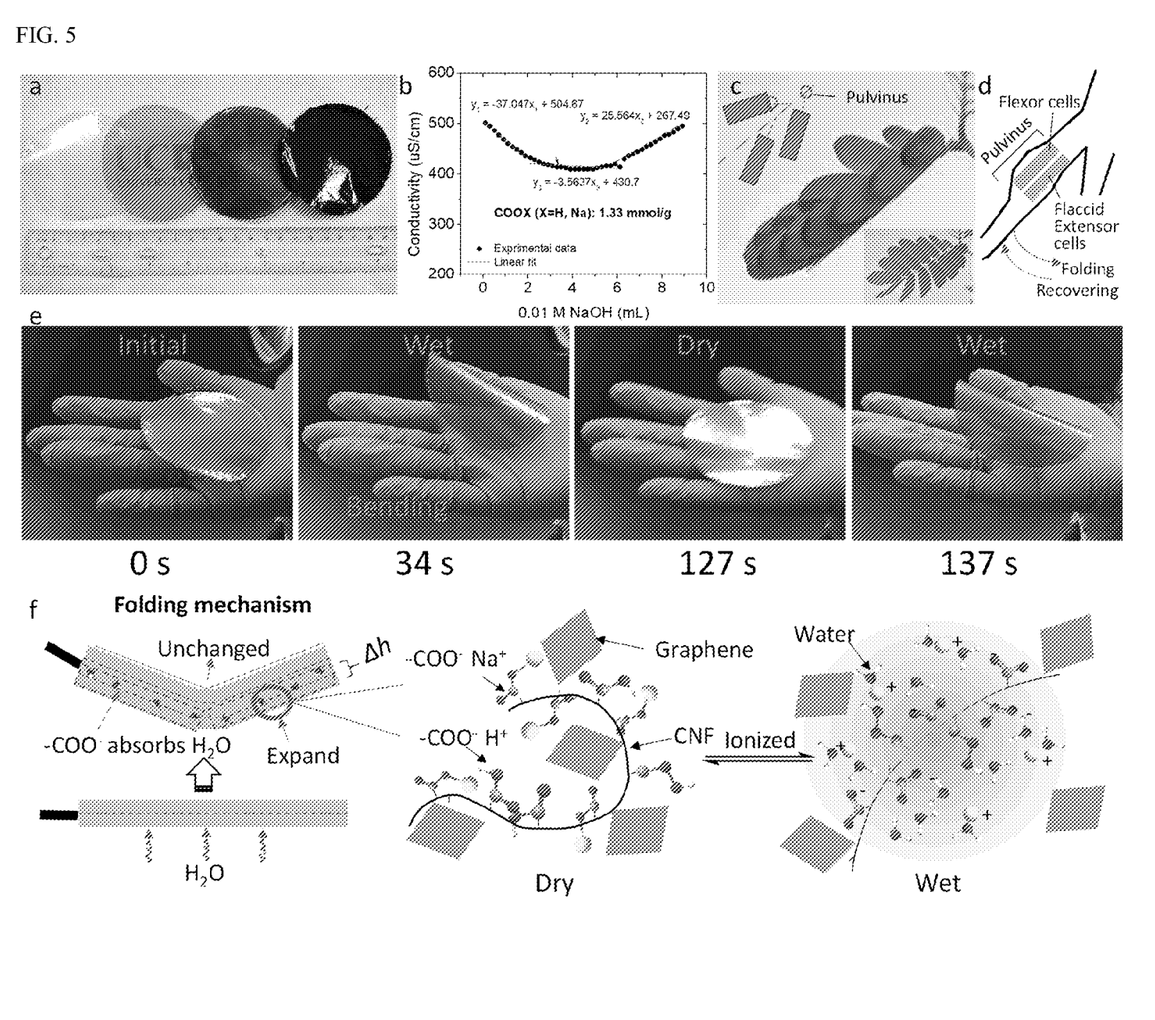

Graphene/CNF nanopaper was made via vacuum filtration of aq. graphene/CNF with 0, 15.2, 20.6 and 23.1% graphene contents in 90-mm diameter and 8 to 23 μm thickness (FIG. 5A). These graphene/CNF paper appeared homogenous and isotropic. CNF defibrillated by TEMPO mediation oxidation and blending carried a 1.33 mmol g$^{-1}$ surface charge as determined by NaOH titration (FIG. 5B), indicating graphene/CNF nanopaper to be highly hygroscopic. Graphene/CNF nanopaper bends away upon exposure to moisture, then flattened and restores rapidly within one second to the original flat form. The moisture triggered bending and flattening could be repeated for tens of times. These motions are similar to the shame plant, *Mimosa pudica* originated from South and Central America, whose compounded leaves (FIG. 5C) that fold inward and droop when touched or shaken physically as a rapid, defensive response then re-open minutes later. The main structural mechanism responsible for the leaves to fold and droop is the pulvinus, where the flexor and extensor "motor cells" on the ventral and dorsal side of the leaf, respectively, that respond based on their relative turgor pressure. Upon touching, the stimulus is transmitted as an action potential to the extensor cells, which is the primary effector of pulvinus bending. The pulvini cells gain and lose turgor pressure due to discrepancy of water flux.

FIG. 5E showed two repeatable cycles without noticeable changes in the morphology of graphene/CNF paper. Meanwhile, the recovering time from bended to the original flat form was only one second. This is highly desirable as the actuation or response time is very important to sensors and actuators, the faster the better. The fast response is believed to be related to the high moisture-acceptor content caused by two major factors, i.e., the highly charged CNF surfaces and the highly accessible, inherently porous microstructure that has been reported to be as high as 13.3% for an all-CNF based nanopaper. Therefore, CNF is particularly useful if aimed for applications in moisture or vapor sensors/actuators.

A simple model is proposed and shown in the side view of a flat nanopaper whose initial top and bottom layers have the same dimension (FIG. 5F). Upon absorbing moisture from the bottom, the lower layer swollen dramatically and expand to bend upward pushing the upper part inward. The hydrophobic planes of CNFs associate with graphene surface through hydrophobic interaction at dry state. Upon exposure to moisture, water vapor diffuses in between CNFs to hydrogen bond with CNF surface hydroxyls and ionize carboxylates to enlarge the inter-CNF spacings, causing volume expansion of the exposed layer, exerting bending action. The rigid and non-absorbing graphene adhered to the hydrophobic surface of CNFs is thought to be responsible to recover to its integral structure of nanopaper upon losing moisture from the hydrophilic CNF surfaces and interfaces.

Figure 6:
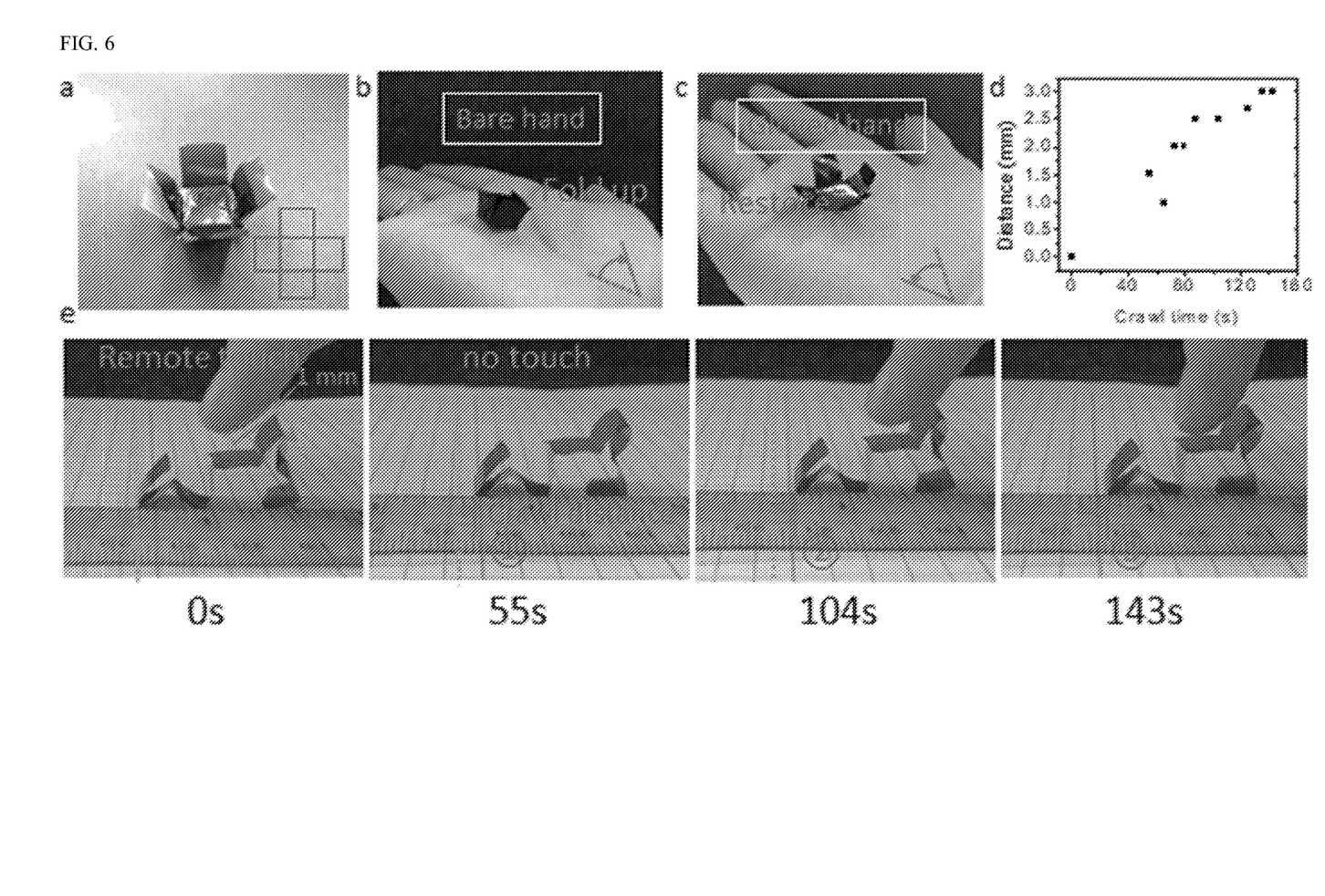
FIG. 6A shows an open box.
FIG. 6B shows four walls closing in upon touching a bare hand.
FIG. 6C shows and recovering back instantly on gloved hand. Folded strip soft robot.
FIG. 6D shows crawl distance vs. time activated by a human finger placed ~1 mm above.
FIG. 6E shows photos of crawling motions. Red arrow marked the distance the soft robot crawled.

Further moisture-triggered motions can be demonstrated as follows. A piece of 8 μm thick graphene/CNF nanopaper containing 23.1% graphene was cut and pre-folded into a five-sided box with four walls open on dry surface (FIG. 6A). The four walls closed in upon being placed on the palm of a bare hand (FIG. 6B) and instantly open up to original on a gloved hand (FIG. 6C). The four graphene/CNF nanopaper walls expand when exposed to the moisture from the hand and the folding motion was reversed within one second upon retracting the bare hand.

The same graphene/CNF nanopaper (8 μm thick, 23.1% graphene) was cut into a 5 cm×1 cm "belt" to demonstrate as a soft robot with crawling behavior. The humidity from a human finger act as an actuating trigger to stimulate the robot to crawl. A bare digit was placed 1-mm over the "head" of the robot and maintained for two seconds to initiate the crawling. This bare figure actuation was repeated to show crawling of approximate 3 mm in distance from five times of actuation in 143 s (FIG. 6D). In three different configurations, graphene/CNF nanopaper has demonstrated its moisture-activated expansion and moisture-lacking retraction motions by moisture stimuli from human breath, hand skin and digits. These robotic motions were repeatable and recoverable to its original status swiftly.

Although the foregoing invention has been described in some detail by way of illustration and Example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A method for preparing graphene comprising mixing graphite and carbon nanofibrils in a solvent to form a mixture comprising graphene at a concentration of at least 0.01 mg mL$^{-1}$, wherein the solvent comprises water.

2. The method of claim 1, wherein the carbon nanofibrils comprise cellulose nanofibrils.

3. The method of claim 1, wherein the weight ratio of the graphite to the carbon nanofibrils is from about 0.2:1 to about 33:1, about 0.2:1, 0.5:1, 1:1, 2:1, 3:1, 6:1, 6.6:1, 7:1, 10:1, 15:1, 20:1, or about 33:1.

4. The method of claim 1, wherein the weight ratio of the graphite to the carbon nanofibrils is from about 1:5 to about 33:1.

5. The method of claim 1, wherein the combined weight of the graphite and the carbon nanofibrils is from about 0.1% to about 0.4%, about 0.1%, 0.12%, 0.14%, 0.16%, 0.2%, 0.24%, 0.26%, 0.3%, 0.32%, 0.35%, or about 0.4%, of the total weight of the mixture.

6. The method of claim 1, wherein the mixture comprises graphene at a concentration of at least 0.1 mg mL$^{-1}$.

7. The method of claim 1, wherein the mixture comprises graphene at a concentration of at least 0.5 mg mL$^{-1}$.

8. The method of claim 1, wherein the mixing is performed using a high-speed blender.

* * * * *